United States Patent

Hawley

[11] Patent Number: 5,314,589
[45] Date of Patent: May 24, 1994

[54] ION GENERATOR AND METHOD OF GENERATING IONS

[76] Inventor: MacDonald Hawley, 2659 Bridger Ct., Evergreen, Colo. 80439

[21] Appl. No.: 961,381

[22] Filed: Oct. 15, 1992

[51] Int. Cl.$^5$ .................. C25B 1/24; C25B 9/00; C02F 1/46
[52] U.S. Cl. .................. 204/128; 204/275; 204/276; 204/149; 204/152; 204/400; 210/748
[58] Field of Search .................. 204/59 R, 128, 101, 204/274, 242, 276, 275, 152, 149; 210/748

[56] References Cited

U.S. PATENT DOCUMENTS

| | | | |
|---|---|---|---|
| 3,677,408 | 7/1972 | Dinizo, Jr. | 210/169 |
| 3,758,276 | 9/1973 | Bond et al. | 23/267 A |
| 4,100,052 | 7/1978 | Stillman | 204/268 |
| 4,328,084 | 5/1982 | Shindell | 204/228 |
| 4,610,783 | 9/1986 | Hudson | 210/169 |
| 4,714,534 | 12/1987 | Fair et al. | 204/269 |
| 4,790,923 | 12/1988 | Stillman | 204/268 |
| 4,808,290 | 2/1989 | Hilbig | 204/229 |
| 4,908,109 | 3/1990 | Wright | 204/149 |
| 4,936,979 | 6/1990 | Brown | 210/85 |
| 4,992,156 | 2/1991 | Silveri | 204/228 |
| 4,997,540 | 3/1991 | Howlett | 204/274 |

Primary Examiner—Kathryn Gorgos
Attorney, Agent, or Firm—Staas & Halsey

[57] ABSTRACT

An ion generator for use in a pool filtration system. The generator uses very thin electrodes placed close together. The electrodes are oriented perpendicular to the flow of a chloride salt/water solution. A baffle is provided immediately upstream of the electrodes to create a turbulent flow of jetted water over the electrodes. Periodically, DC polarity to the electrodes is reversed and an AC ripple is caused at the electrodes. The electrodes generate very active chlorine ions in solution which serve as a biocide, without creating harmful chlorine gases.

20 Claims, 7 Drawing Sheets

ION GENERATOR AND METHOD OF GENERATING IONS

BACKGROUND OF THE INVENTION

1. Field of the Invention

This invention relates to ion generators and, more particularly, to a device and related method for electrolytically generating halogen ions from a salt halide solution for use as a biocide in a swimming pool.

2. Background Information

Traditionally, chemicals such as calcium hypochloride have been added to water supplies to serve as a "biocide", defined herein as an agent capable of eliminating as a health risk algae, bacteria and viruses. However, using such chemicals is expensive, represents serious shipping, storage and safety concerns, and results in uneven concentrations and dissipated effectiveness over time. See, e.g., U.S. Pat. Nos. 4,790,923 and 4,100,052.

Biocidal activity can also be accomplished by using electrolysis to produce sufficient ions in solution to disrupt cell membranes or protein sheaths by rapid chemical interaction. In this regard, ion generators, are known which are capable of creating ions from salt solutions for use in, e.g., a swimming pool filtration system. An example of such an ion generator follows.

U.S. Pat. No. 4,100,052 describes a generator of chlorine ions from a chloride salt/water solution. The generator uses electrodes in the form of platinum coated plates which are parallel to the salt/water solution flow. The plates are about 0.02–0.06 inch thick and spaced about 0.025–0.5 inch apart. The ion generator is used in a swimming pool water filtration system or to treat sewage or cooling tower water.

The drawbacks of conventional ion generators follow.

These generators usually operate by electrolyzing a sodium chloride/water solution contained within a chamber, attracting positively charged sodium ions to a negatively charged cathode and attracting negatively charged chloride ions to a positively charged anode, thereby liberating chlorine gas at the anode. The chlorine gas is then used to chlorinate the water within a swimming pool, spa or the like. See U.S. Pat. Nos. 4,808,290, 4,997,540, and 4,328,084. However, chlorine gas is highly poisonous and excessive inhalation may cause death.

U.S. Pat. No. 4,808,290 provides a device which captures and passes the chlorine gas through a reaction column and cathode chamber. It would be preferable, however, to avoid altogether the production of chlorine gas.

Electrodes in the form of plates running parallel to the direction of flow of the salt/water solution are inefficient. That is, molecules that are ionized at the beginning of a first plate are attracted to a second opposite plate and may be neutralized before they pass beyond the end of the first plate, thereby wasting the electric current used to produce the ions.

The electrodes of conventional ion generators are relatively thick and are arranged in relatively widely spaced relation. This is not the most efficient configuration for ion generation, again because ion neutralization may occur.

Conventional ion generators also rely merely on normal water flow to pass over the electrodes. Due to this configuration, the ions formed tend to linger near the plates. As a result, the ions fail to enter the water supply in a timely manner and, therefore, do not fully serve their biocidal purpose.

Further, many of the conventional ion generating systems, and the related methods of use, such as described in the above-discussed U.S. Pat. No. 4,808,290, are either too expensive, complicated or cumbersome for widespread use with swimming pools, especially residential pools.

As discussed above, the prior art still does not teach an ion generator and method for ion generation which are capable of the most efficient production of halogen ions from a halide salt/water solution.

SUMMARY OF THE INVENTION

Accordingly, it is a purpose of the present invention to provide an ion generator which does not generate dangerous chlorine gas.

It is another purpose of the present invention to provide a device and method for providing a low cost halogen biocidal agent for the treatment of liquid affluents, especially swimming pools, cooling towers or sewage.

It is another purpose of the present invention to produce halogen ions from liquid affluent containing low levels of halide and using low levels of electricity.

It is another purpose of the present invention to provide an ion generator wherein the electrodes are thin foil members arranged very close and parallel to each other, but perpendicular to the flow of the salt/water solution.

It is another purpose of the present invention to provide an ion generator promoting more efficient generation of halogen ions.

It is another purpose of the present invention to provide an ion generator which induces ions to migrate away from the generator and into the water supply immediately after generation.

It is still another purpose of the invention to provide an ion generator and related method which are less expensive, less complicated and less cumbersome than conventional generators and methods.

It is another purpose of the present invention to simplify swimming pool management by using sensors, logical analysis, and switches to automatically control various systems that manage the pool water environment.

It is another purpose of the present invention to provide an ion generator which easily can be used with a new swimming pool or spa filtration system, or retrofitted to an existing system.

It is another purpose of the present invention to provide a method for more efficiently producing biocides.

It is another purpose of the present invention to provide a simpler and more effective method for keeping swimming pool or spa water healthful.

To achieve the foregoing and other purposes of the present invention there is provided an ion generator used to produce a halogen ion biocide from a halide salt/water solution to be used in a water supply.

The ion generator includes electrodes which are: (1) very narrow, e.g., of foil thickness; (2) placed very close together; (3) subjected to a transverse flow of salt/water solution; (4) frequently reversed in DC polarity to prevent calcification; (5) subjected to an AC ripple current to prevent ions formed from lingering around the electrodes; and (6) subjected to turbulent or jetted water produced by a baffle to increase water flow over the electrodes and facilitate dispersion of the ions into the water supply.

The ion generator produces very active ions (e.g., Cl, $O_2$, $O_3$, and H), from the salt (e.g., NaCl, HCl, $MgCl_2$, etc.)/water solution using low voltage electric current. The ions are accelerated as little as possible to prevent chlorine gas formation. In this regard, water/salt solution is constantly passed over the electrodes at moderate pressure. Prior thereto, the solution is passed through a baffle that generates the jetted water to keep the ions produced in suspension, i.e., to move the ions off the electrodes as quickly as they are formed. The ions exist for only about 30 minutes, after which they undergo molecular reformation.

In a particular embodiment, the ion generator is used in a swimming pool filtration system, including, in a first conduit in general downstream order: a fluid inlet from the pool water (which includes the salt at small concentrations); a heater; a pump; a filter; a pressure adjust valve; and an outlet to the pool water.

Between the filter and the outlet to the pool water there is provided a second conduit in fluid communication with the first conduit. The second conduit includes, again in general downstream order: a sensor for measuring the pH of the salt/water solution; a sensor for measuring oxidation/reduction reactions, indicative of the biocidal level of the solution based on the number of active ions present; a water pressure sensor; a temperature sensor; an acid source with injector; a base source with injector; a venturi; a grounding screen; and the ion generator described above positioned in a housing. Each of the sensors feeds input to a controller, which controls the heater, the pump, the acid and base injectors and the ion generator.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE PREFERRED EMBODIMENTS

Preferred embodiments according to the present invention will now be described with reference to FIGS. 1-7.

Figure 1:
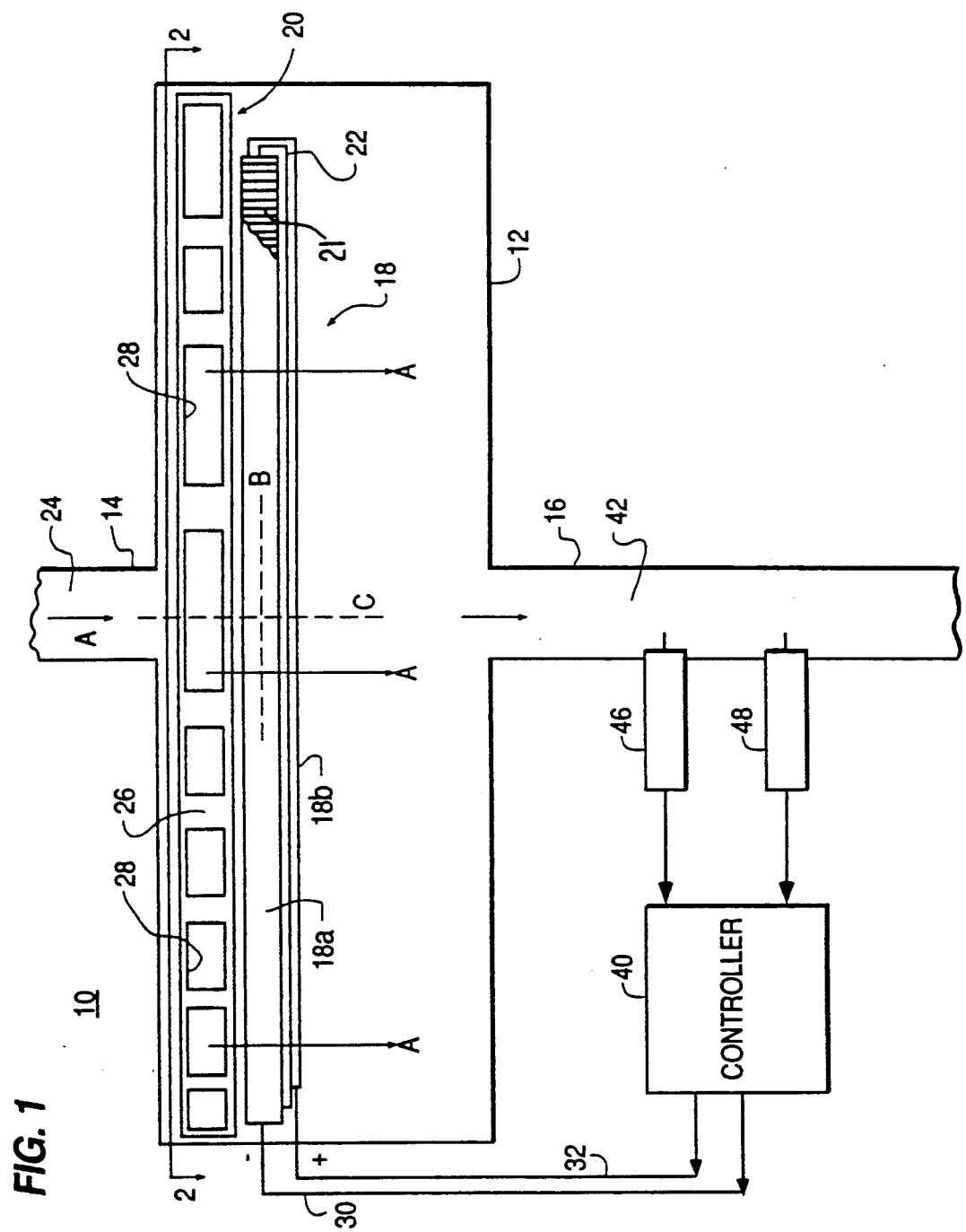
FIG. 1 is a top view of an ion generator according to one embodiment of the present invention.
Figure 2:
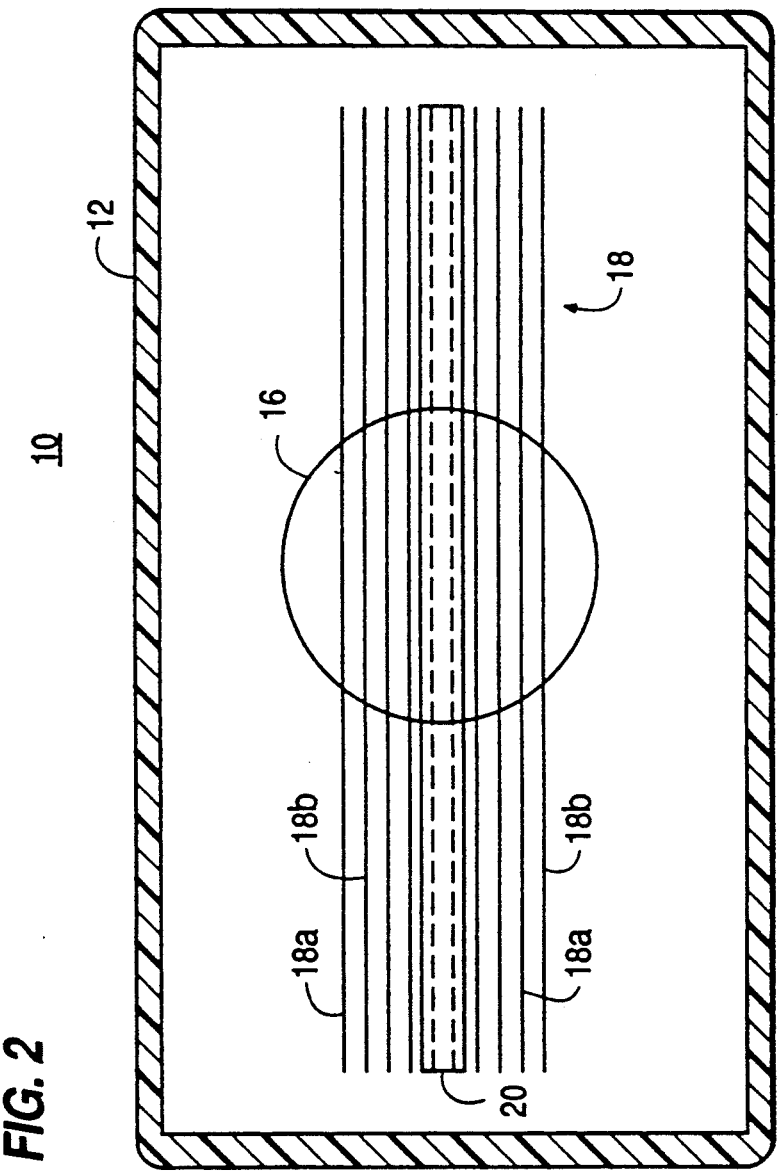
FIG. 2 is a front view of the ion generator shown in FIG. 1, taken along line 2—2 of FIG. 1.

FIGS. 1 and 2 illustrate a first embodiment of an ion generator according to the present invention indicated generally by reference numeral 10. The generator 10 includes a housing 12 with a fluid inlet 14 and a fluid outlet 16.

The housing 12 is preferably made of clear acrylic about ¼ inch thick and water tight at common side-wall edges. The ability to see through the housing 12 facilitates detection of problems with the components in the housing, such as calcification on the electrodes described below, and otherwise allows viewing of the operation of these components.

Inside the housing 12, there is positioned, in downstream order, a plurality of electrodes 18 and baffle means 20.

The electrodes 18 (only two of which are shown in FIG. 1 for simplicity) are preferably very thin (about 1-3 millimeters thick), elongated, rectangular foil members. The electrodes 18 are preferably spaced 2-5 millimeters apart. Each electrode 18 in this embodiment is about 1" wide × 8" long. The plurality of electrodes 18 is oriented in a parallel relationship.

The electrodes 18 are made of an electrically conductive material that is resistant to the electrolyte, preferably a corrosion resistant alloy, e.g., including predominantly nickel and copper and parts of aluminum and/or silicon, such as Monel® 400, or 316L stainless steel. Other appropriate materials include the noble metals, such as titanium and platinum, however, these metals are not preferred because of their high cost.

In order for the electrode foils to withstand the pressure of the water moving through the housing (since they are very thin and oriented transverse to the flow of water), the foils include a closely spaced carrier 21 (seen in a partial cut away in FIG. 1). There should not be more than a few square inches of foil exposed without support. Alternatively, it is possible to adhere the foil as a surface layer to another thicker, electrically conductive metal, in order to obtain rigidity. Adherence can be through several means including physical contact or the application of glue over a portion of the surface.

A first, longitudinal axis B of each electrode 18 is oriented transverse to the direction of flow of the electrolyte, a salt/water solution 24. The direction of flow is indicated by arrow A. A second, transverse axis C of each electrode 18 is arranged parallel to the direction of flow A.

The salt/water solution 24 includes water to which has been added concentrations of 2-10, but preferably 4, ppm of any one of a number of salts, such as the chloride salts NaCl, KCl, $MgCl_2$.

Sodium chloride is preferred because of its low cost, high solubility and easy availability.

That is, chlorine has the best record when used as a disinfectant or for other water quality purposes. Calcium chloride, potassium chloride, and some iodides and bromides also have potential for use as salts in the electrolyte. Other halogen salts would potentially promote the production of other respective halogen gases: a bromide would create bromine gas; an iodide would create iodine gas. However, the present invention would produce a compound containing the element and not a free gas which could enter the air.

The solution 24 enters the housing 12 via the fluid inlet 14. For uses other than with a pool, suggested salt concentrations can be 2,000 ppm to 8,000 ppm.

One set of the plates 18 is the cathodes 18a, each of which is connected by a wire 30 to a controller 40 to be negatively charged. Another set of electrodes 18, the anodes 18b, is connected to the controller 40 by wire 32, but to be positively charged. A power source 54 (FIG. 6) is connected to the controller 40. The power source 54 can be, e.g., regular household current or a gas powered generator.

The controller 40 is a microprocessor driven sub-system, including a printed circuit board with analog to digital chips, analog amplifiers and relays for controlling the various external devices. The controller 40 receives input from external sensors designed to detect various conditions, as described below. The controller 40 closes relays to effect changes in the external devices (pump motor, heater, power supply for ion generator) to adjust the conditions to the desired levels. This would include the pH, temperature, water pressure, and the amount of chlorine generated.

The controller 40 can be software driven with the intent of keeping the levels of the inputs within certain bounds—such as keeping the pH between 7.1 and 7.4, for instance.

Preferably, there are five electrodes (cathodes) 18a on the negative supply side and five electrodes (anodes) 18b on the positive supply side, although as indicated above, only one of each is shown in FIG. 1. A low voltage direct current, e.g. between 4 and 12 volts, is normally supplied from the controller 40 to the electrodes 18a, 18b. The low voltage reduces the possibility of current leakage straying into the electrolyte stream to provide greater safety for the system.

In the first embodiment shown in FIGS. 1 and 2, the baffle means 20 includes a flat, rectangular member 26 made of about ⅛ inch thick acrylic and including a plurality of rectangular, varying-width slots 28. Like the electrodes 18, a first, longitudinal axis B of the flat member 26 is oriented transverse to the flow A, whereas a second, transverse axis C is parallel to flow A.

The slots 28 cause the flow of incoming salt/water solution 24 to be agitated or disturbed, but also uniformly distributed across the electrodes 18. This turbulent or jet action keeps the ions that are produced at the electrodes 18 moving off of the electrodes 18 as quickly as possible. The salt/water solution 24 passes over the electrodes 18a, 18b at moderate pressure, about 10–40 pounds gauge.

As the salt/water solution 24 passes over the electrodes, the electrodes 18, when electrically activated by the controller 40, cause the water to separate into hydrogen and oxygen ions, and the salt to separate into Cl and Na ions.

More particularly, sodium chloride (NaCl) when placed into water generates two ions—the sodium ion and the chloride ion. When electrolysis occurs hypochlorous acid is formed at the anode and hydroxide ions are formed at the cathode. If the two sources of ions mingle, they can be thought of as forming sodium hypochlorite. In actuality only ions are formed. The ions are independent of one another and it is not correct to say that there is salt formed, but rather sodium ions and chloride ions. There is not lye, but sodium ions and hydroxide ions. There is not hydrochloric acid, but hydrogen ions and chloride ions. Hypochlorous acid, however, does not separate completely into an ionic state, and there is hypochlorous acid formed and part of it separates into hydrogen ions and hypochlorous ions.

Chlorine is generated at the anode plate, but it immediately goes into solution. If too much current is supplied, a chlorine gas may form as bubbles and drift to the surface of the electrolyte and then evaporate. The chlorine actually forms hypochlorous acid by interacting with the water. Thus, there is formed chlorine in the form of hypochlorous acid, not chlorine gas in solution.

A highly active biocidal solution 42 results which is unstable for a short period of time. That is, within about 30 minutes of ceasing the electric current from the controller 40 to the electrodes 18, molecules, such as NaCl, reform from the ions.

The solution 42, while it exists, is neither strongly acid nor base, there is no odor present, and the cost to manufacture the solution 42 is minimal.

The ion migration from an electrode of origin 18a (cathode) to an opposite electrode 18b (anode), which can short the power supply, can be reduced by inserting an insulator 22 between the electrodes 18a, 18b.

Polarity of the electrodes is reversed about every minute to prevent oxidation or calcification buildup on the electrodes. If calcification occurs, it could bridge the electrodes 18 and short the system.

While generating the large numbers of active ions, the ion generator 10 produces little or no chlorine gas. That is, the present invention keeps bubbles from forming on the electrodes 18. In order to do this, the molecules coming into the electrodes to accept an electron or give up an electron are accelerated as little as possible. By decreasing acceleration, the possibility of cavitation on the plate surface decreases.

The invention takes three different steps to discourage cavitation. The first is making the electrodes from foil and placing the electrodes 18a, 18b as close together as possible. Second, the salt/water solution 24 is passed through the baffle means 20 to create jetted water which crosses over the electrodes at moderate pressure under constant flow. Third, a 10% high frequency alternating current ripple is applied to the electrodes 18 via wires 30, 32 to force the ions off the electrodes 18 once produced. These steps cooperate to prevent a large number of ions from accumulating on the electrodes and forming chlorine gas bubbles which could escape from solution and create a dangerous situation.

The ability to measure the degree to which active ions have been produced is essential to inform the operator that the solution being produced is serving its biocidal function. More particularly, it is known that above 1½ parts per million free chlorine, which is easily measurable, is a biocide and an acceptable level for swimming pools. In this regard, a chemical activity sensor 46 is connected upstream of the ion generator 10 and is connected to the controller 40.

A water pressure sensor 48 is also connected upstream of the ion generator 10 to detect the water pressure moving through the ion generator 10. The pressure sensor 48 is also connected to the power controller 40.

Figure 3:
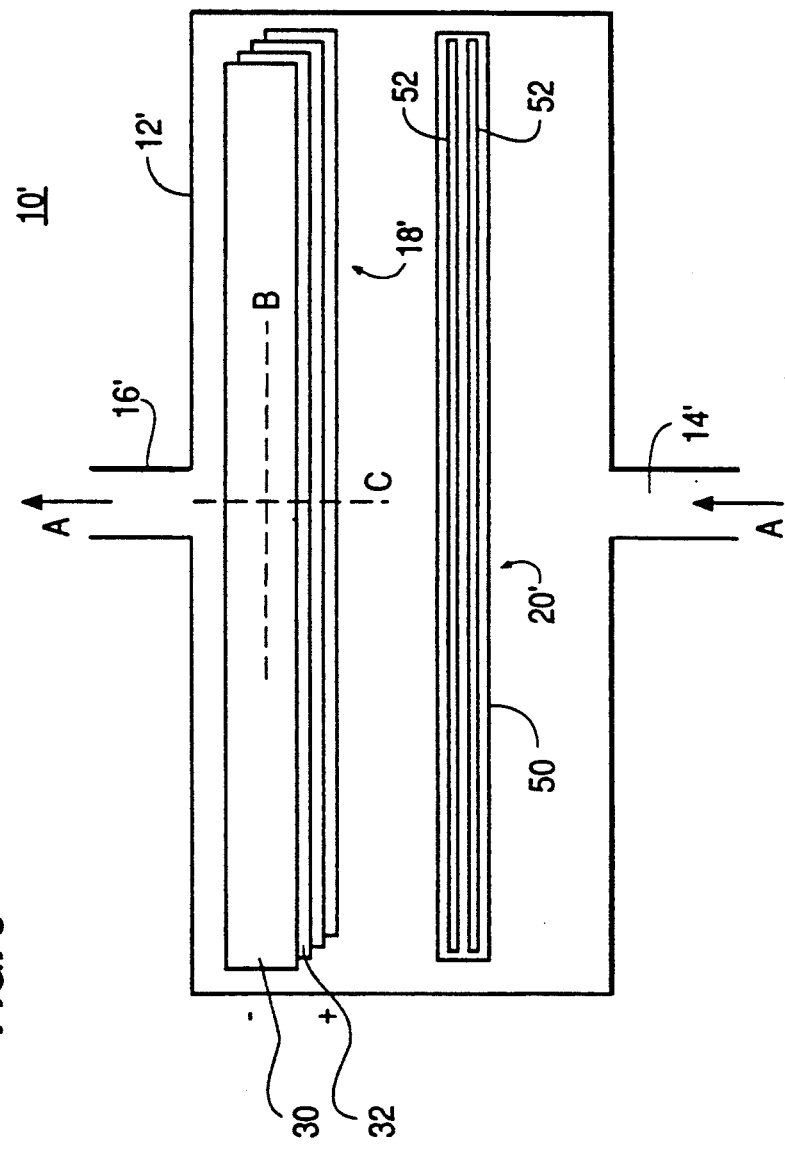
FIG. 3 is a top view of a second embodiment of the ion generator according to the present invention.

FIG. 3 illustrates a second embodiment of an ion generator 10' according to the present invention. In this embodiment there are five pairs of elongated foil electrodes 18' positioned close to each other, as in the first embodiment. The baffle means 20' is a rectangular elongated member 50 including longitudinal slits 52 which cause turbulent water flow through the housing 12' of the ion generator 10'. The housing 12' includes a fluid inlet 14' and a fluid outlet 16'. Again, the first, longitudinal axis B of each electrode 18 is transverse to the flow A, but the transverse axis C is parallel.

Figure 4:
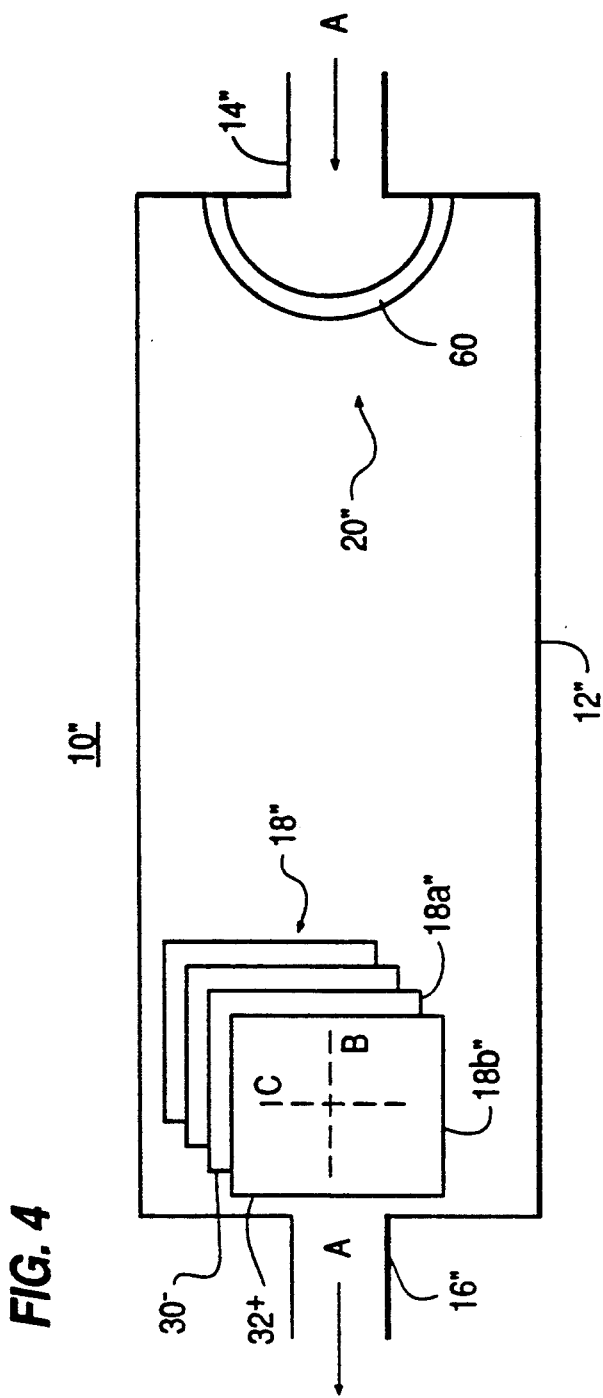
FIG. 4 is a top view of a third embodiment of the ion generator according to the present invention.
Figure 5:
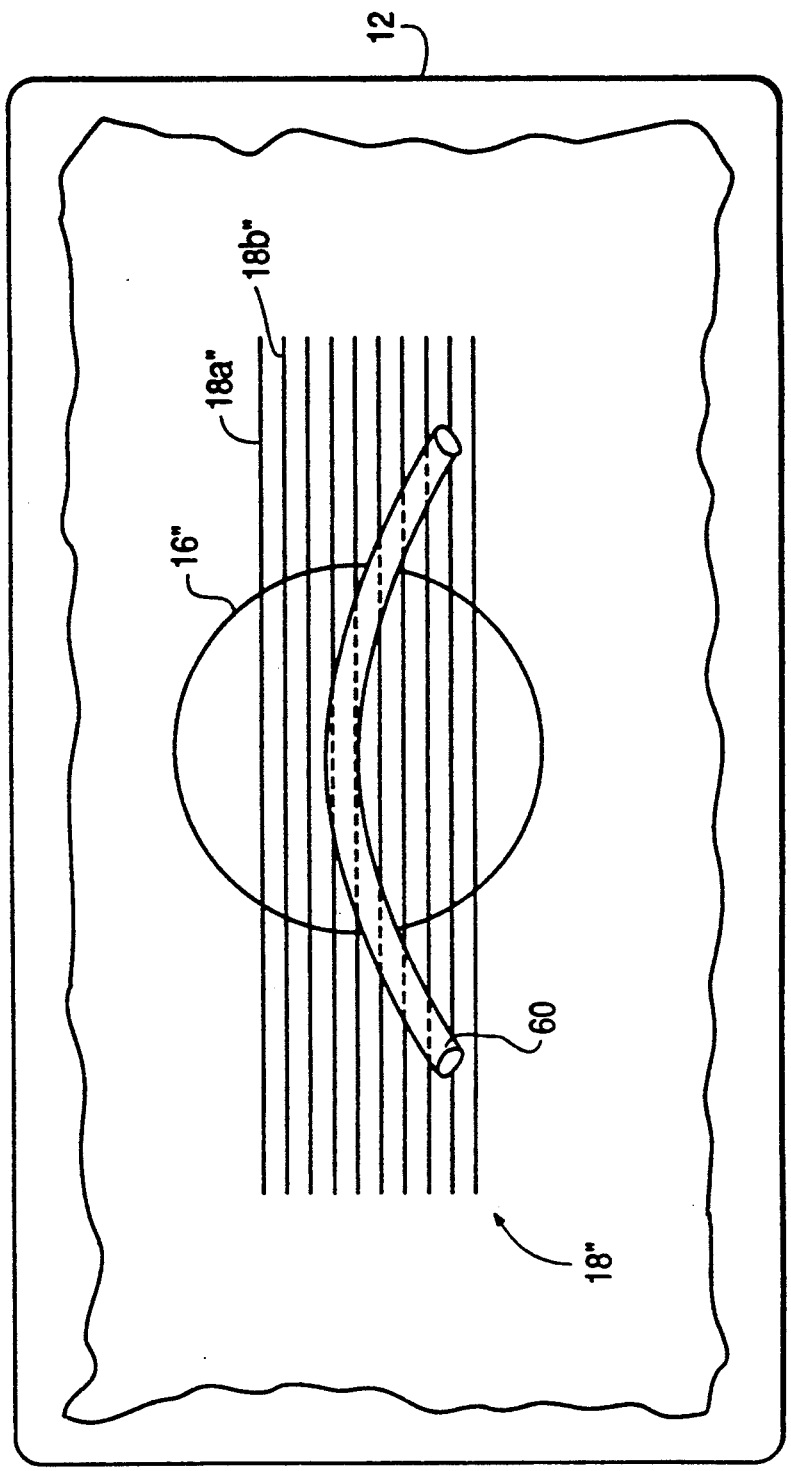
FIG. 5 is a front view of the ion generator shown in FIG. 4 with part of a front wall of the housing cut away.

FIGS. 4 and 5 illustrate a third embodiment of an ion generator 10" according to the present invention. In this embodiment, there are five pairs of 2"×2" square foil electrodes 18" positioned close to each other, five electrodes 18a" being the cathodes and five 18b" being the anodes. The housing 12" again includes a fluid inlet 14" and a fluid outlet 16". The baffle means 20" is in the form of a U-shaped member 60 near the inlet 14" which causes turbulent water flow through the housing 12". Again, a first axis B is transverse to the flow A, but a second axis is parallel.

As stated above, the conventional ion generators place the longitudinal axes of relatively thick electrode plates parallel to the flow of water. An ion generated at one end of the plate merely migrates over to the other end of the plate and connects the circuit together, using much electricity without generating many ions. By making the electrodes very narrow and arranging the longitudinal axis thereof 90° transverse to the flow of water A, ions that are generated on the electrode surface between the positive and negatively charged electrodes are immediately forced off the electrode and into solution.

Figure 6:
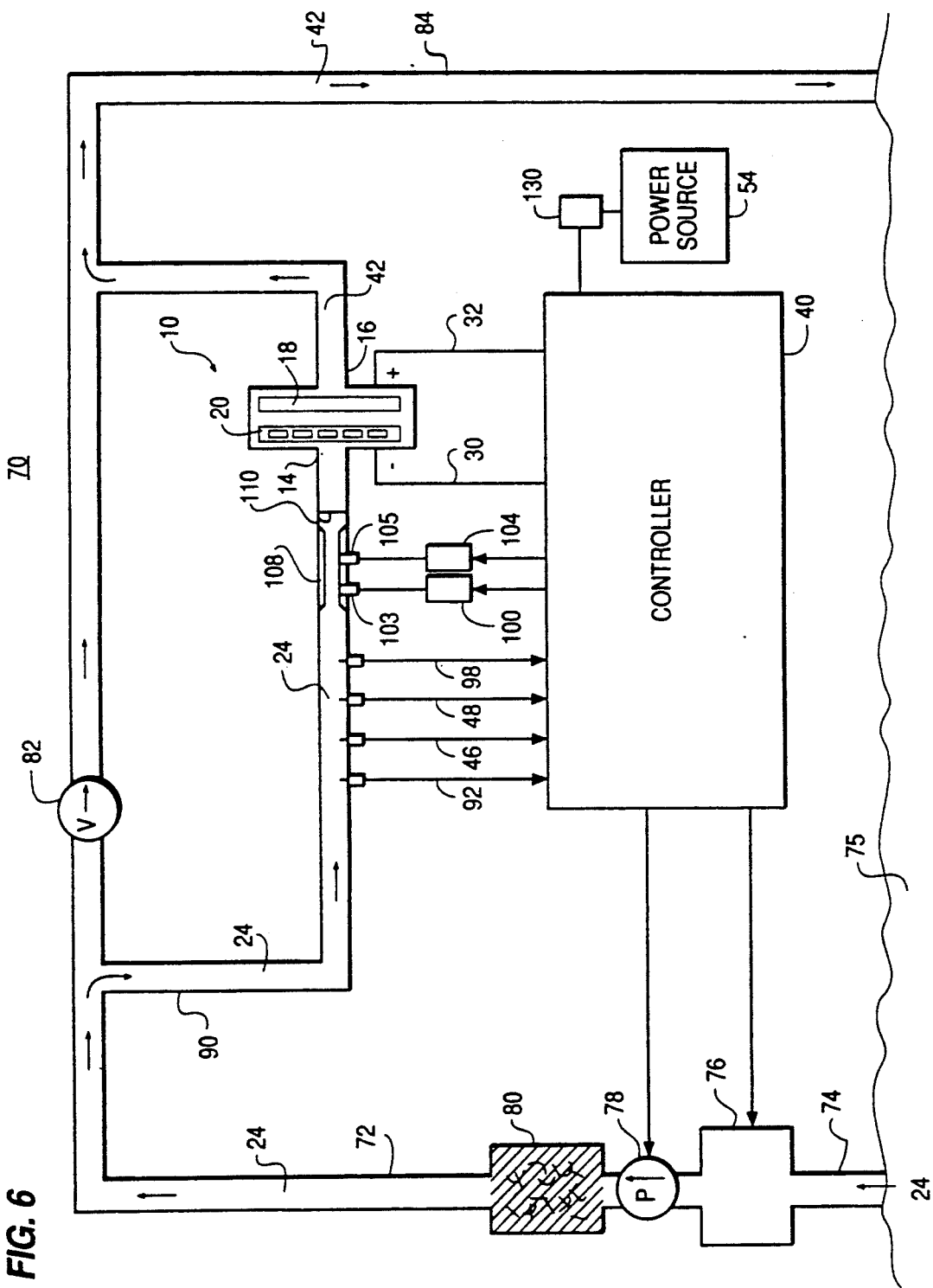
FIG. 6 is a schematic view of a swimming pool filtration system incorporating the ion generator according to the present invention.

A specific embodiment, wherein the ion generator 10 described above is used with a spa or swimming pool filtration system, will now be described with reference to FIGS. 6 and 7.

There are four factors that usually must be controlled to provide a pleasant, healthful swimming pool or spa environment. Water temperature, pH (acidity/alkalinity), level of biocide and volume of water flowing past a filter to remove sediment. Satisfying all four factors in the past has involved many different steps, mostly manual, on the part of a pool operator, including checking the water temperature by means of a thermometer, testing water quality and pH with chemical kits, adding acid or base to the water to change pH, adding a biocide to the water, and checking gauge pressure on the outlet of the filter to determine if the filter has become clogged. The present invention automatically performs these steps efficiently and economically.

In this particular embodiment, the ion generator 10 is used in a pool filtration system 70, including, in a first conduit 72 in general downstream order: a fluid inlet 74 from the pool water 75; a heater 76; a pump 78; a filter 80; a pressure adjust valve 82; and a fluid outlet 84 to the pool water 75.

Non-iodized salt (NaCl) is added to the water 75 at two to eight thousand parts per million, but preferably three thousand parts per million concentration, to form the salt solution 24.

Thus, one feature of the present invention is that the ion generator can function for a swimming pool environment at very low concentrations of halogen salt in the system. The concentration recommended for use with this generator ranges between 0.5 and 5 grams per liter, but preferably between 1 and 3 grams/liter. This gives the pool user a salt solution 24 to swim in that does not burn the eyes, does not dehydrate the skin, and feels softer and more pleasant than typical chemically sanitized pools.

Between the filter 80 and the outlet 84 there is included a second conduit 90 in fluid communication with the first conduit 72. The second conduit 90 includes, again in downstream order: a sensor 92 for measuring pH; the chemical activity sensor 46 for measuring oxidation/reduction reactions, indicative of the sanitization level based on the number of active ions present; the water pressure sensor 48; a temperature sensor 98; an acid source 100 with a solenoid valve injector 103; a base source 104 with a solenoid valve injector 105; a venturi 108; a grounding screen 110; and the ion generator 10 described above.

With the present invention, monitoring and adjusting pH is not as critical as with conventional chemical biocide systems. Said conventional systems result in large swings in pH between the introduction of chemical, e.g. dry chlorine, the dissipation thereof with time, again adding the chemical, and so on. With the present invention, the generation of ions does not result in such large pH swings. As such, the pH sensor 92 feedback can be optional with the present invention.

While the ion generator 10 is running, there is a potentially damaging flow of current going upstream away from the ion generator 10 back to the sensors 92, 46, 48, 98. Encapsulating the sensors or putting the stainless grid grounding screen 110 between the sensors and the generator will ground any stray currents.

The venturi 108 causes increased velocity of the water prior to reaching the baffle means 20.

During operation, the electrodes 18 will leach oxides or build up calcium. The injectors 103, 105 drive either pumps or a venturi connected to the acid 100 or base 104 sources. Injection of either of these very active chemicals can clean the electrodes 18.

Figure 7:
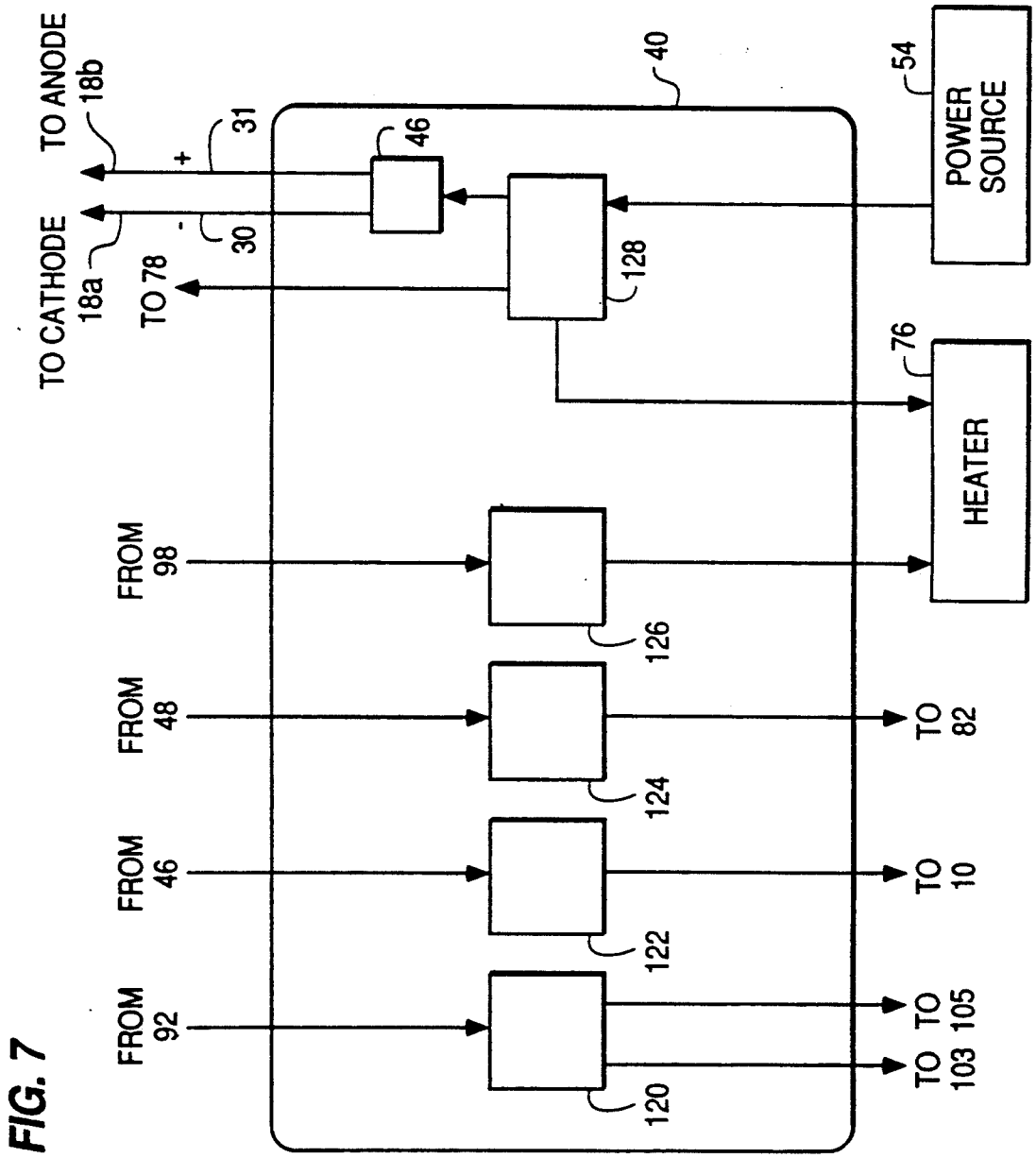
FIG. 7 is a schematic view of the controller according to the present invention.

With reference to FIG. 7, the relationships of the various sensors 92, 46, 48, 98 to the controller 40 and the relationship of the controller 40 to the various components of the system, will now be described.

The pH sensor 92 inputs an electrical signal to means 120 for controlling the acid and base injectors 103, 105. The means 120 sends a signal to either the acid injector 103 or base injector 105, as appropriate, to add acid or base to the solution 24.

Certain compounds tend to deposit on electrodes depending on whether the solution is acidic or basic. The largest problem occurs with the deposition of calcium when the system becomes basic. Adding acid tends to reverse and prevent this action. Unfortunately, acid also tends to dissolve most metals. Thus, if the pool water is circulated through a pump or a heater, the equipment may be deteriorated by the acidic nature of the water by dissolving some of the metal from the equipment.

By mounting the acid/base source injectors 103, 105 in front of the ion generator 10, it is possible to clean the electrodes 18 by injecting acid or base into the water flow.

It is safe to inject moderate amounts of acid or base into the pool water. The range of pH variation is generally small as stated above and the introduction of either the acid or the base will be done directly to the water in small quantities which will create no problem for the swimmer. These acid and base adjustments can also be done with salts rather than by the direct addition of acid or base. Thus, one might add sodium carbonate (a salt) to increase the pH and make the pool more basic. Hydrochloric acid or sodium hydroxide can also be used.

The chemical activity sensor 46 (also known as an oxidation/reduction probe) sends an electrical signal to means 122 for controlling ion activity. The means 122 starts and stops the ion generator 10, to increase or decrease, respectively, ion generation.

Since the sensor 46 is used to measure the chemical activity of the halogen ions produced, it should be away from the input of acids and bases and should reflect the ionic activity in the main body of water. The sensor 46, therefore, should be placed near the input to the halogen ion generator. The sensor 46 is electrical in nature and, therefore, should be kept away from any other device which might induce a current in the water.

The pressure sensor 48 detects water pressure and sends an electrical signal to means 124 for controlling the pressure adjust valve 82. The means 124 sends an electrical signal to activate the pressure adjust valve 82 to increase or decrease the pressure in the system, as needed.

More particularly, the pressure sensor 48 seeks to determine if water pressure is at about 10–40 lbs. gauge. If not, the pressure adjust valve 82 is partially closed to increase pressure or partially opened to decrease pressure, as necessary.

The temperature sensor 98 inputs an electrical signal to means 126 for controlling temperature, which in turn controls the heater 76.

The power source 54 provides power to the ion generator 10 via means 128 for distributing power which is within the controller 40. This means 128 is capable of distributing both DC and AC power. That is, the means 128 connects through a double-pole throw switch 47 to distribute the DC power to the cathodes 18a and the anodes 18b. The means 128 also periodically provides an AC ripple to the cathodes 18a and the anodes 18b. The AC ripple has a 10K to 100K hz frequency.

The AC ripple can be created by adding an electrically controlled valve to the power supply (SCR (silicon controlled rectifier) or Power Mos FET transistor) which creates an alternating current component of the DC supply to reverse the direction of the current for a specified period of time. The major purpose of the AC ripple is to cause corrosion to dissolve due to the reversal of the deposition process.

Operation of this pool filtration system embodiment of the present invention will now be explained.

To activate the system 70, the power is turned on via an on-off switch 130 The controller 40, via the means for distributing power 128, activates the pump 78 which causes water to move through the system 70. The salt/water solution 24 passes through the baffle means 20 that generates turbulent action to keep the ions produced in suspension and to move the ions off the electrodes 18 as quickly as possible. The salt/water solution 24 is constantly passed over the electrodes 18 at moderate pressure. The sensors 92, 46, 48 and 98 all feed appropriate information to the controller 40 which in turn controls the heater 76, pump 78, acid source injector 103, base source injector 105, and ion generator 10.

Electrical current (DC) is sent to the electrodes 18a and 18b to begin ion production. The polarity is reversed once a minute via the double pole, double throw switch 47. If polarity is not switched, the ion generator 10 will not work very long because the tightly coupled plates are going to calcify and be shorted and non-useful. An AC ripple is also periodically caused in the current via the means for distributing power 128 in the controller 40.

The chemical activity sensor 46 measures ionic production activity, and when an adequate supply of ions has been produced to serve a biocidal purpose, the ion generator is shut off.

The pH sensor 92 detects the relative amount of acid or base in the water and adds acid or base as needed, via the acid and base injectors 103, 105.

The temperature sensor 98, if one is used, detects the temperature of the water and activates the heater 76 accordingly.

Temperature may affect ion production but not to a large extent. A heater probably isn't needed except to heat the pool in general. Most heaters have their own controlling thermostat, but it could be controlled from the controller.

The pump for the pool is normally operated from 4 hours per day to non-stop. This is done to prevent the pool water from becoming stagnant. The generator could be turned off for periods by, e.g., a timer, but the monitoring needs to remain active to turn on the generator and to adjust the pH, etc. The system may also be operated continuously to keep fluid passing over the plates to help prevent buildup of chemical deposits.

Using a non-ionizing reference voltage (1.0 volt or less) and measuring the voltage drop across the electrodes 18 with the power supply 54 removed, it is possible to measure the conductivity of the water and thereby infer the salt content of the water to determine if more salt must be added by the operator.

More particularly, the current flowing through the electrodes determines the amount of hypochlorous acid generated assuming that there is sufficient salt in the water to allow the flow of current. If the current drops to a low level, an additional amount of salt should be added. Once the current reaches a predetermined level, no more salt is needed. This salt should be added in small quantities at wide intervals to allow it to mix with the pool water and to give it time to circulate back to the sensors. The amounts of salt, the intervals, and the current range is a function of the size of the pool. It is not necessary to have a direct function between current readings and the amount of salt added. Also, the amount of salt is a function of current, not voltage. Most likely the controller will maintain a fixed voltage while the current will change if the salt content is lost for one reason or another. If all salt were lost, no current would flow.

As can be seen, the preferred embodiments of the present invention generate halogen ions in a water solution—not halogen gas. The invention eliminates the gas by causing the molecules to break up as gently as possible and to form their individual ionic compounds.

The present demand for a biocidal agent in swimming pools is chlorine because of its effectiveness, but the ion generator according to the present invention can also produce other halogens such as iodine or bromine which are also biocidally active.

It is contemplated that the ion generator 10, in addition to its use for swimming pool maintenance, could just as easily be used for halogen biocidal agent generation necessary for sewage treatment or cooling tower water. The active solution formed is an ionic soup of various compounds that is highly unstable. When operation of the generator 10 is disconnected, the ions disappear in about 30 minutes. However, while present, they are highly biocidal.

The foregoing is considered illustrative only of the principles of the invention. Further, since numerous modifications and changes will readily occur to those skilled in the art, it is not desired to limit the invention to the exact construction and operation shown and described. For example, although various positions are described for the components of the system in a downstream order, this order is not mandatory. Accordingly, all suitable modifications and equivalents may be resorted to that fall within the scope of the invention and the appended claims.

What is claimed is:

We claim:

1. A system for generating a halogen ion biocide, comprising:
   a housing;
   a fluid inlet for the housing including a halide salt/water solution;
   a fluid outlet for the housing;
   a first electrode located between the inlet and outlet in the housing;
   a second electrode spaced from the first electrode and located in the housing;
   means for causing the salt/water solution to flow against the electrodes,
   wherein each first and second electrode has a first longitudinal axis and a second, relatively narrower transverse axis, and
   wherein the first longitudinal axis of each first and second electrode is oriented transverse to the flow of the salt/water solution and the second narrower axis of each first and second electrode is oriented parallel to the flow of salt/water; and
   a source for providing electric current to the first and second electrodes to cause electrolysis and the formation of halogen ions from the salt/water solution.

2. The system as recited in claim 1, wherein the electrodes are spaced apart in a range of 2-5 millimeters.

3. The system as recited in claim 1, wherein the thickness of the electrodes is in the range of 1-3 millimeters.

4. The system as recited in claim 1, wherein the electrodes are made of a predominantly nickel and copper alloy.

5. The system as recited in claim 1, wherein the electric current source is DC and the polarity of the DC current is periodically reversed between the electrodes.

6. The system as recited in claim 1, further comprising:
   means for subjecting the electrodes to an AC ripple to prevent ions formed at the electrodes from lingering at the electrodes.

7. The system as recited in claim 1, further comprising:
   a baffle creating jets of water directed over the electrodes.

8. The system as recited in claim 1, wherein the halide salt is a chloride salt selected from group of: NaCl, KCl and MgCl$_2$.

9. The system as recited in claim 1, further comprising:
   a first conduit in fluid communication with a halide salt/water solution supply; said first conduit including a heater, a pump, a filter, and a pressure adjust valve; and
   a second conduit in fluid connection with the first conduit, the second conduit including, a sensor for measuring pH of the salt/water solution, a sensor for measuring oxidation/reduction reactions within the salt/water solution, indicative of the biocide level based on the number of active ions present, a water pressure sensor, a temperature sensor, an acid source with injector, a base source with injector, a venturi, a grounding screen and said ion generator being in fluid communication with the second conduit.

10. A method for generating halogen ions from a halide salt/water solution, comprising the steps of:
    forming a housing with an inlet including a halide salt/water solution and an outlet;
    forming a first electrode in the housing;
    forming a second electrode adjacent the first electrode in the housing;
    forming each first and second electrode to have a first longitudinal axis and a second, relatively narrower transverse axis;
    orienting the first longitudinal axis of each first and second electrode transverse to the flow of the salt/water solution;
    orienting the second narrower axis of each first and second electrode parallel to the flow of salt/water;
    providing electric current to the first and second electrodes; and
    causing the salt/water solution to flow against the electrodes;
    wherein the halogen ions are generated at the electrodes and enter the salt/water solution.

11. The method as recited in claim 10, wherein the step of providing electric current comprises the steps of providing a DC electric current and periodically reversing polarity between the electrodes.

12. The method as recited in claim 10, further comprising the step of:
    subjecting the electrodes to an AC ripple to prevent ions formed at the electrodes from lingering at the electrodes.

13. The method as recited in claim 10, further comprising the step of:
    directing jets of water over the electrodes to increase the flow of the salt/water solution over the electrodes.

14. A system for generating a halogen ion biocide, comprising:
    a housing;
    a fluid inlet for the housing including a halide salt/water solution;
    a fluid outlet for the housing;
    a first electrode located between the inlet and outlet in the housing;
    a second electrode spaced from the first electrode and located in the housing,
    wherein each first and second electrode has a first longitudinal axis and a second, relatively narrower transverse axis, and
    wherein the first longitudinal axis of each first and second electrode is oriented transverse to the flow of the salt/water solution and the second narrower axis of each first and second electrode is oriented parallel to the flow of salt/water;
    a baffle for creating jets of water directed over the electrodes; and
    a source for providing electric current to the first and second electrodes to cause electrolysis and the formation of halogen ions from the salt/water solution.

15. The system as recited in claim 14, wherein the electrodes are spaced apart in a range of 2-5 millimeters.

16. The system as recited in claim 14, wherein the thickness of the electrodes is in the range of 1-3 millimeters.

17. The system as recited in claim 14, wherein the electrodes are made of a predominantly nickel and copper alloy.

18. The system as recited in claim 14, wherein the electric current source is DC and the polarity of the DC current is periodically reversed between the electrodes.

19. The system as recited in claim 14, further comprising:
    means for subjecting the electrodes to an AC ripple to prevent ions formed at the electrodes from lingering at the electrodes.

20. The system as recited in claim 14, wherein the halide salt is a chloride salt selected from group of: NaCl, KCl and MgCl$_2$.

* * * * *